United States Patent
Rajendiran et al.

(10) Patent No.: US 10,830,499 B2
(45) Date of Patent: Nov. 10, 2020

(54) TRANSCRITICAL SYSTEM WITH ENHANCED SUBCOOLING FOR HIGH AMBIENT TEMPERATURE

(71) Applicant: Heatcraft Refrigeration Products LLC, Stone Mountain, GA (US)

(72) Inventors: Vinoth Raj Rajendiran, Tamil Nadu (IN); Saravana Vaithilingam Sakthivel, Tamil Nadu (IN); Arijit Mukherjee, West Bengal (IN)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 275 days.

(21) Appl. No.: 15/465,321

(22) Filed: Mar. 21, 2017

(65) Prior Publication Data

US 2018/0274823 A1    Sep. 27, 2018

(51) Int. Cl.
*F25B 1/10* (2006.01)
*F25B 5/02* (2006.01)
(Continued)

(52) U.S. Cl.
CPC ............... *F25B 9/008* (2013.01); *F25B 1/10* (2013.01); *F25B 5/02* (2013.01); *F25B 40/02* (2013.01);
(Continued)

(58) Field of Classification Search
CPC .......................... F25B 9/008; F25B 2309/061; F25B 2400/05; F25B 2400/054; F25B 2400/16;
(Continued)

(56) References Cited

U.S. PATENT DOCUMENTS

| 7,178,359 B2 | 2/2007 | Oshitani et al. |
| 7,228,707 B2 * | 6/2007 | Lifson ....................... F25B 5/00 62/510 |

(Continued)

FOREIGN PATENT DOCUMENTS

| JP | 2001-1221517 | 8/2001 |
| WO | 2006022829 A1 | 3/2006 |

(Continued)

OTHER PUBLICATIONS

Extended European Search Report, Application No. 18162747.2, dated Oct. 24, 2018, 9 pages.

(Continued)

*Primary Examiner* — Edward F Landrum
*Assistant Examiner* — Daniel C Comings
(74) *Attorney, Agent, or Firm* — Baker Botts L.L.P.

(57) ABSTRACT

In certain embodiments, a transcritical refrigeration system provides refrigeration by circulating refrigerant through the system. The system includes a gas cooler, a heat exchanger, a high pressure expansion valve, a flash tank, refrigeration cases, and compressors. The gas cooler cools the refrigerant to a first temperature. The heat exchanger cools the refrigerant flowing from the gas cooler to the high pressure expansion valve to a second temperature. The high pressure expansion valve is coupled to the flash tank, which is coupled to the refrigeration cases. The refrigeration cases are coupled to the compressors, which are coupled to the gas cooler. An expansion valve between the gas cooler and the heat exchanger may cool the refrigerant flowing to the heat exchanger. A high pressure vapor compressor between the heat exchanger and the gas cooler may compress the refrigerant flowing from the heat exchanger to the gas cooler.

17 Claims, 6 Drawing Sheets

(51) Int. Cl.
| | |
|---|---|
| *F25B 9/00* | (2006.01) |
| *F25B 40/02* | (2006.01) |
| *F25B 41/04* | (2006.01) |
| *F25B 49/02* | (2006.01) |
| *F25B 5/04* | (2006.01) |

(52) U.S. Cl.
 CPC .............. *F25B 41/04* (2013.01); *F25B 49/02* (2013.01); *F25B 5/04* (2013.01); *F25B 2309/061* (2013.01); *F25B 2400/075* (2013.01); *F25B 2400/13* (2013.01); *F25B 2400/16* (2013.01); *F25B 2400/23* (2013.01); *F25B 2600/2513* (2013.01); *F25B 2700/191* (2013.01)

(58) Field of Classification Search
 CPC .. F25B 2400/23; F25B 2400/075; F25B 5/02; F25B 5/04; F25B 2400/13
 See application file for complete search history.

(56) References Cited

U.S. PATENT DOCUMENTS

| | | | |
|---|---|---|---|
| 7,779,647 B2 | 8/2010 | Takeuchi et al. | |
| 2004/0123624 A1 | 7/2004 | Ohta et al. | |
| 2006/0168997 A1* | 8/2006 | Imai | F25B 5/02 62/513 |
| 2010/0223938 A1* | 9/2010 | Bush | F25B 9/008 62/117 |
| 2012/0011866 A1* | 1/2012 | Scarcella | F25B 1/10 62/79 |
| 2012/0103005 A1 | 5/2012 | Kopko et al. | |
| 2012/0291461 A1 | 11/2012 | Verma et al. | |
| 2013/0111944 A1 | 5/2013 | Wang et al. | |
| 2013/0125569 A1 | 5/2013 | Verma et al. | |
| 2014/0345318 A1 | 11/2014 | Nagano et al. | |
| 2015/0253040 A1* | 9/2015 | Aschan | F25B 40/00 62/498 |
| 2016/0102901 A1 | 4/2016 | Christensen et al. | |
| 2017/0102169 A1* | 4/2017 | Zimmermann | F25B 5/00 |
| 2017/0328604 A1* | 11/2017 | Fredslund | F25B 9/008 |

FOREIGN PATENT DOCUMENTS

| | | |
|---|---|---|
| WO | 2008130358 A1 | 10/2008 |
| WO | 2012/012485 | 1/2012 |
| WO | 2012/012488 | 1/2012 |
| WO | 2012/012493 | 1/2012 |
| WO | 2012/168544 | 12/2012 |

OTHER PUBLICATIONS

European Patent Office, Communication with Search Report, Application No./Patent No. 15195039.1-1602, Reference 31.13.126033, dated Mar. 14, 2016, 6 pages.

* cited by examiner

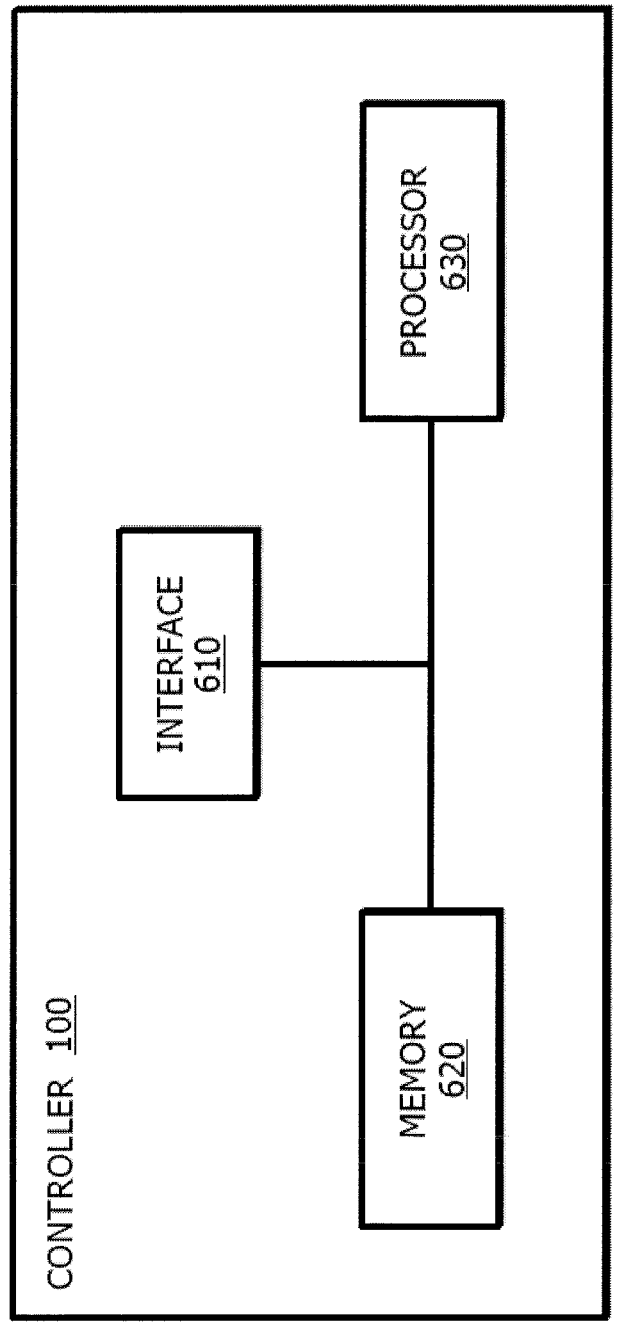

TRANSCRITICAL SYSTEM WITH ENHANCED SUBCOOLING FOR HIGH AMBIENT TEMPERATURE

TECHNICAL FIELD

This disclosure relates generally to a refrigeration system. More specifically, this disclosure relates to enhanced subcooling for a transcritical system for use with high ambient temperatures.

BACKGROUND

Refrigeration systems can be used to regulate the environment within an enclosed space. Various types of refrigeration systems, such as residential and commercial, may be used to maintain cold temperatures within an enclosed space such as a refrigerated case. To maintain cold temperatures within refrigerated cases, refrigeration systems control the temperature and pressure of refrigerant as it moves through the refrigeration system. When controlling the temperature and pressure of the refrigerant, refrigeration systems consume power. It is generally desirable to operate refrigeration systems efficiently in order to avoid wasting power.

SUMMARY OF THE DISCLOSURE

In certain embodiments, a transcritical refrigeration system circulates refrigerant (e.g., carbon dioxide ($CO_2$)) through the system to provide refrigeration. The transcritical refrigeration system comprises a gas cooler, a heat exchanger, a high pressure expansion valve, a flash tank, one or more refrigeration cases, and one or more compressors. The gas cooler is operable to cool the refrigerant to a first temperature. The heat exchanger comprises first and second refrigerant inlets coupled to the gas cooler; a first refrigerant outlet coupled to the high pressure expansion valve; and a second refrigerant outlet coupled to the gas cooler. The heat exchanger is operable to cool the refrigerant flowing from the first refrigerant inlet to the first refrigerant outlet using the refrigerant flowing from the second refrigerant inlet to the second refrigerant outlet. The refrigerant is cooled to a second temperature, which is less than the first temperature. The high pressure expansion valve is coupled to the flash tank and reduces a pressure of the refrigerant flowing from the heat exchanger to the flash tank. The flash tank is coupled to the one or more refrigeration cases, and the one or more refrigeration cases are coupled to the one or more compressors. The one or more compressors are coupled to the gas cooler.

In particular embodiments, an expansion valve is coupled between the gas cooler and the second inlet of the heat exchanger. The expansion valve cools the refrigerant flowing to the second inlet of the heat exchanger. The system may also include a high pressure vapor compressor coupled between the second outlet of the heat exchanger and the gas cooler. The high pressure vapor compressor compresses a vapor form of the refrigerant flowing from the second outlet of the heat exchanger to the gas cooler.

In particular embodiments, a valve is coupled between the gas cooler, the heat exchanger, and the high pressure expansion valve. The valve directs a flow of the refrigerant towards the heat exchanger or towards the high pressure expansion valve. A processor may control the valve. The processor may control the valve to direct the flow of the refrigerant towards the heat exchanger when an ambient temperature is above a threshold (e.g., thirty degrees Celsius).

In particular embodiments, a processor controls the expansion valve to modify a temperature of the refrigerant flowing towards the heat exchanger. The processor may modify the temperature of the refrigerant flowing towards the heat exchanger based on an ambient temperature.

In some embodiments, a subcooler for a transcritical refrigeration system comprises a heat exchanger. The heat exchanger includes a first and a second refrigerant inlet and a first and a second refrigerant outlet. The heat exchanger is operable to: receive the refrigerant (e.g., carbon dioxide ($CO_2$)) at the first refrigerant inlet, the received refrigerant at the first refrigerant inlet comprising a first temperature; receive the refrigerant at the second refrigerant inlet, the received refrigerant at the second refrigerant inlet comprising a second temperature, lower than the first temperature; cool the refrigerant flowing from the first refrigerant inlet to the first refrigerant outlet to a third temperature less than the first temperature using the refrigerant flowing from the second refrigerant inlet to the second refrigerant outlet; transmit the refrigerant at the first refrigerant outlet to a high pressure expansion valve coupled to a flash tank; and transmit the refrigerant at the second refrigerant outlet to the gas cooler.

In particular embodiments, an expansion valve is coupled to the second inlet of the heat exchanger. The expansion valve cools the refrigerant flowing from the gas cooler to the second inlet to the second temperature. A high pressure vapor compressor may be coupled to the second outlet of the heat exchanger. The high pressure vapor compressor compresses a vapor form of the refrigerant flowing from the second outlet of the heat exchanger to the gas cooler.

In particular embodiments, a valve is coupled to the second inlet of the heat exchanger. The valve controls the flow of refrigerant towards the second inlet of the heat exchanger. A processor may control the valve to control the flow of refrigerant towards the second inlet of the heat exchanger. The processor may direct the flow of refrigerant towards the second inlet of the heat exchanger when an ambient temperature is above a threshold (e.g., thirty degrees Celsius).

In particular embodiments, a processor controls the expansion valve to modify a temperature of the refrigerant flowing towards the heat exchanger. The processor may modify the temperature of the refrigerant based on an ambient temperature.

Certain embodiments may provide one or more technical advantages. Certain embodiments may result in more efficient operation of refrigeration system. For example, the heat exchanger reduces the flash gas from the high pressure expansion valve into the flash tank by subcooling the gas cooler outlet. Reducing the flash gas results in lower power consumption. Particular embodiments may increase the system's coefficient of performance (COP) by 9.5% at high ambient temperature conditions (e.g., 38 degrees Celsius) compared to a similar carbon dioxide ($CO_2$) transcritical refrigeration system with parallel compression that lacks the heat exchanger. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 4 illustrates an example of a controller of a refrigeration system, according to certain embodiments.

DETAILED DESCRIPTION

Figure 1:
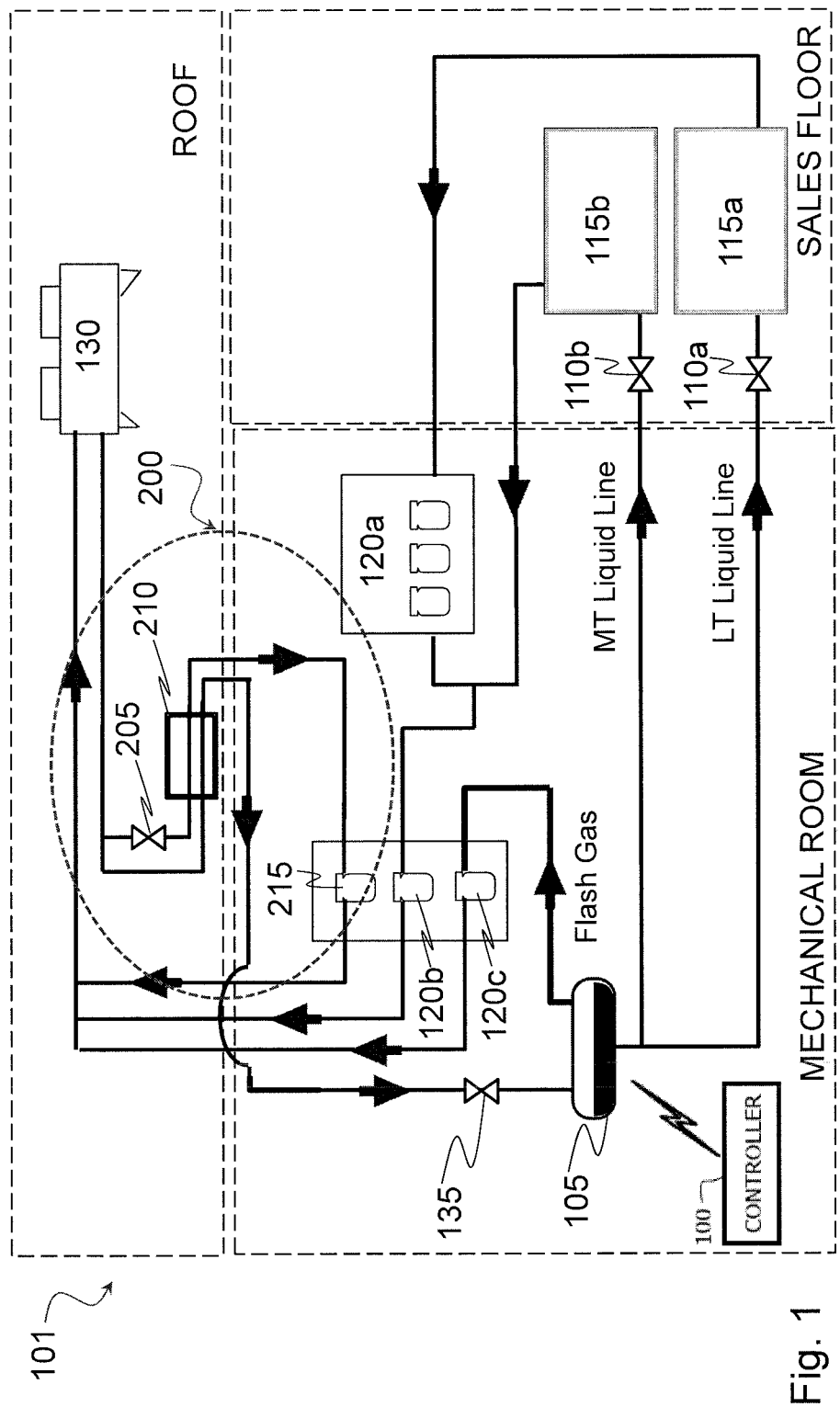
FIG. 1 is a block diagram illustrating an example refrigeration system according to some embodiments.

In general, a refrigeration system cools a refrigeration load using cool liquid refrigerant circulated from a flash tank to the refrigeration load. As an example, the refrigeration load may include one or more temperature-controlled cases, such as low temperature (LT) and medium temperature (MT) grocery store cases for storing frozen food and fresh food (e.g., fruits, vegetables, eggs, milk, beverages, etc.), respectively. Cooling the refrigeration load causes the refrigerant to expand and to increase in temperature. The refrigeration system compresses and cools the refrigerant discharged from the refrigeration load so that cool liquid refrigerant can be recirculated through the refrigeration system to keep the refrigeration load cool.

To compress the refrigerant, the refrigeration system includes one or more compressors. Examples of compressors include one or more LT compressors configured to compress refrigerant from the LT case and an MT compressor configured to compress refrigerant from the MT case. The compressors may also include one or more parallel compressors and one or more ejector(s). Generally, a parallel compressor operates "in parallel" to another compressor (such as an MT compressor) of the refrigeration system, thereby reducing the amount of compression that the other compressor needs to apply. Similarly, an ejector can act as a compressor to reduce the amount of compression that another compressor needs to apply.

In a conventional transcritical booster refrigeration system, such as a carbon dioxide ($CO_2$) transcritical booster refrigeration system, a gas cooler outlet leads to a high pressure expansion valve (HPEV). The HPEV reduces pressure of the refrigerant, which results in formation of $CO_2$ refrigerant flash gas and liquid.

A reduction in the amount of flash gas formed may reduce compressor power consumption. One way to reduce flash gas is elevate the flash tank intermediate temperature, but this increases evaporator mass flow rate. Another solution is to subcool the refrigerant after the gas cooler.

Subcooling the high pressure $CO_2$ refrigerant before the HPEV results in formation of a lesser amount of flash gas and a higher amount of liquid refrigerant. Particular embodiments provide subcooling using a heat exchanger between the gas cooler and the HPEV. For example, the gas cooler outlet may be branched into two lines. One line is connected to one side of the heat exchanger and then to the HPEV. The other side is connected to an expansion valve and then to the other side of the heat exchanger. Thus, a portion of the refrigerant from the gas cooler outlet is used to cool the remaining refrigerant from the gas cooler outlet that flows to the HPEV.

For example, stream of high pressure $CO_2$ gas may be throttled to a pressure of geometric mean of the gas cooler pressure and the MT evaporator pressure using an expansion valve. A fraction of the $CO_2$ liquid obtained during throttling may be used to cool the other stream of high pressure $CO_2$ gas going to the HPEV using a heat exchanger (e.g., plate heat exchanger, shell and tube heat exchanger, etc.). This reduces the amount of generated flash gas.

The expanded gas used for subcooling then needs to be compressed, but at a much higher pressure (e.g., 52 bar) compared to flash gas (e.g., 36.7 bar), which significantly reduces the pressure ratio of the compressor and lowers the power consumption. Also, the number of compressors in the system does not increase because the number of parallel compressors is reduced based on the lesser amount of flash gas. Thus, the embodiments do not incur costs of adding additional compressors.

Embodiments of the present disclosure and their advantages are best understood by referring to FIGS. 1 through 4 of the drawings, like numerals being used for like and corresponding parts of the various drawings.

FIG. 1 is a block diagram illustrating an example refrigeration system according to some embodiments. Transcritical refrigeration system 101 includes a gas cooler 130, a high pressure expansion valve 135, a flash tank 105, one or more expansion valves 110 corresponding to one or more evaporators 115 (also referred to as refrigeration cases 115), and one or more compressors 120. Particular embodiments may include controller 100.

Transcritical refrigeration system 101 includes subcooler 200. Subcooler 200 includes expansion valve 205, heat exchanger 210, and high pressure vapor compressor 215.

Each component may be installed in any suitable location, such as a mechanical room (e.g., FIG. 1 depicts flash tank 105, compressors 120, and high pressure expansion valve 135 in a mechanical room), in a consumer-accessible location (e.g., FIG. 1 depicts expansion valves 110 and evaporators 115 on a sales floor), or outdoors (e.g., FIG. 1 depicts gas cooler 130 on a rooftop).

Although particular components are illustrated in particular locations, these are examples, and other embodiments may locate components at any suitable location. For example, although expansion valve 205 and heat exchanger 210 are illustrated on the roof, other embodiments may locate one or both of expansion valve 205 and heat exchanger 210 in the mechanical room, or any other suitable location.

First valve 110a may be configured to discharge low-temperature liquid refrigerant to first evaporator 115a (also referred to herein as low-temperature ("LT") case 115a). Second valve 110b may be configured to discharge medium-temperature liquid refrigerant to evaporator 115b (also referred to herein as medium-temperature ("MT") case 115b). In certain embodiments, LT case 115a and MT case 115b may be installed in a grocery store and may be used to store frozen food and refrigerated fresh food, respectively.

In some embodiments, first evaporator 115a may be configured to discharge warm refrigerant vapor to first compressor 120a (also referred to herein as an LT compressor 120a) and second evaporator 115b may be configured to discharge warm refrigerant vapor to a second compressor 120b (also referred to herein as an MT compressor 120b). In such a refrigeration system, first compressor 120a provides a first stage of compression to the warmed refrigerant from the LT case 115a and discharges the compressed refrigerant to second compressor 120b or parallel compressor 120c (e.g., depending on the configuration of refrigerant lines and valves within the system).

For example, in certain embodiments, the compressed refrigerant discharged from first compressor 120a joins the warm refrigerant discharged from MT case 115b and flows to second compressor 120b or parallel compressor 120c for compression. The inlet to second compressor 120b may be referred to as MT suction. The refrigerant discharged from second compressor 120b and/or parallel compressor 120c may then be discharged to gas cooler 130 for cooling. At this phase the refrigerant is at a high pressure and high temperature (e.g., 92 bar and 120 degrees Celsius).

Gas cooler 130 discharges refrigerant which may continue to high pressure expansion valve 135. High pressure expansion valve 135 reduces the pressure of the refrigerant, which results in a mixture of vapor and liquid refrigerant. The mixed-state refrigerant then flows from high pressure expansion valve 135 through flash tank 105 where it is separated into vapor (i.e., flash gas) and liquid refrigerant.

The liquid refrigerant flows from the flash tank 105 to one or more of the cases 115 through expansion valves 110 and the cycle begins again. The vapor refrigerant flows from the flash tank 105 to one or more of MT compressor 120b and/or parallel compressor 120c.

A reduction in the amount of flash gas formed by high pressure expansion valve 135 may reduce power consumption of compressors, such as compressors 120. Subcooler 200 reduces the temperature of the refrigerant after gas cooler 130.

Subcooler 200 includes expansion valve 205, heat exchanger 210, and high pressure vapor compressor 215. From the outlet of gas cooler 130, the refrigerant branches into two lines that are coupled to heat exchanger 210. One line is coupled to expansion valve 205 which expands the refrigerant flowing to one inlet of heat exchanger 210. For example, expansion valve 205 may throttle the refrigerant to a pressure of geometric mean of the high side pressure and the MT evaporator pressure. This refrigerant is used to cool the refrigerant flowing into the other inlet of heat exchanger 210. For example, a fraction of the liquid refrigerant obtained during throttling may be used to cool the other stream of high pressure refrigerant entering the other side of heat exchanger 210 and destined for high pressure expansion valve 135.

The cooled refrigerant from heat exchanger 210 flows to high pressure expansion valve 135. A particular advantage of subcooler 200 is that subcooling the high pressure refrigerant before high pressure expansion valve 135 reduces the amount of flash gas and increases the amount of liquid refrigerant produced by high pressure expansion valve 135.

The expanded gas used for subcooling (i.e., the output of expansion valve 205) is compressed after exiting heat exchanger 210 by high pressure vapor compressor 215. The expanded gas used for subcooling, however, is at a much higher pressure (e.g., 52 bar) compared to flash gas (e.g., 36.7 bar). This significantly reduces the pressure ratio of the compressor and lowers the power consumption. Also, the number of compressors in the system does not increase because the number of compressors 120 is reduced based on the lesser amount of flash gas. Thus, the embodiments do not incur costs of adding additional compressors.

In particular embodiments, heat exchanger 210 may comprise a plate heat exchanger, such as a brazed plate heat exchanger, a shell and tube heat exchanger, or any other heat exchanger suitable for cooling refrigerant. Heat exchanger 210 comprises two refrigerant inlets and two refrigerant outlets. A first refrigerant inlet is coupled to gas cooler 130. A second refrigerant inlet is coupled to gas cooler 130 via expansion valve 205. The refrigerant received at the second refrigerant inlet is used to cool the refrigerant received at the first refrigerant inlet. The first refrigerant outlet discharges the cooled refrigerant from the first refrigerant inlet towards high pressure expansion valve 135. The second refrigerant outlet discharges the refrigerant from the second refrigerant inlet towards high pressure vapor compressor 215 and then back to gas cooler 130.

Particular embodiments may include additional components, such as a valve to bypass subcooler 200. For example, under a threshold ambient temperature, subcooler 200 may be less efficient. The valve may be used to bypass subcooler 200 when its benefits are not needed. In some embodiments, the valve may be included as part of expansion valve 205, or may comprise an additional valve (FIG. 3A includes an example of a branching or bypass valve).

In some embodiments, refrigeration system 101 may be configured to circulate natural refrigerant such as carbon dioxide ($CO_2$). Some embodiments may use any suitable refrigerant. Natural refrigerants may be associated with various environmentally conscious benefits (e.g., they do not contribute to ozone depletion and/or global warming effects) . As an example, certain embodiments can be implemented in a transcritical refrigeration system (i.e., a refrigeration system in which the heat rejection process occurs above the critical point) comprising a gas cooler and circulating the natural refrigerant $CO_2$.

As discussed above, refrigeration system 101 includes one or more compressors 120. Refrigeration system 101 may include any suitable number of compressors 120. Compressors 120 may vary by design and/or by capacity. For example, some compressor designs may be more energy efficient than other compressor designs and some compressors 120 may have modular capacity (i.e., capability to vary capacity). As described above, compressor 120a may be an LT compressor that is configured to compress refrigerant discharged from an LT case (e.g., LT case 115a) and compressor 120b may be an MT compressor that is configured to compress refrigerant discharged from an MT case (e.g., MT case 115b).

In some embodiments, refrigeration system 101 includes a parallel compressor 120c. Parallel compressor 120c may be configured to provide supplemental compression to refrigerant circulating through the refrigeration system. For example, parallel compressor 120c may be operable to compress flash gas discharged from flash tank 105.

As depicted in FIG. 1, refrigeration system 101 may include one or more gas coolers 130 in some embodiments. Gas cooler 130 is configured to receive compressed refrigerant vapor (e.g., from MT and parallel compressors 120b, 120c) and cool the received refrigerant. In some embodiments, gas cooler 130 is a heat exchanger comprising cooler tubes configured to circulate the received refrigerant and coils through which ambient air is forced. Inside gas cooler 130, the coils may absorb heat from the refrigerant and rejects to ambient, thereby providing cooling to the refrigerant.

In some embodiments, refrigeration system 101 includes high pressure expansion valve 135. High pressure expansion valve 135 may be configured to reduce the pressure of refrigerant. In some embodiments, this reduction in pressure causes some of the refrigerant to vaporize. As a result, mixed-state refrigerant (e.g., refrigerant vapor and liquid refrigerant) is discharged from high pressure expansion valve 135. In some embodiments, this mixed-state refrigerant is discharged to flash tank 105.

In some embodiments, refrigeration system 101 includes expansion valve 205. Expansion valve 205 controls the flow of refrigerant. Expansion valve 205 may comprise a thermostatic expansion valve, an electronic expansion valve, or any other suitable expansion valve.

Refrigeration system 101 may include a flash tank 105 in some embodiments. Flash tank 105 may be configured to receive mixed-state refrigerant and separate the received refrigerant into flash gas and liquid refrigerant. Typically, the flash gas collects near the top of flash tank 105 and the liquid refrigerant is collected in the bottom of flash tank 105. In some embodiments, the liquid refrigerant flows from flash tank 105 and provides cooling to one or more evaporates (cases) 115 and the flash gas flows to one or more compressors (e.g., MT compressor 120b and/or parallel compressor 120c) for compression.

Refrigeration system 101 may include one or more evaporators 115 in some embodiments. As depicted in FIG. 1, the refrigeration system includes two evaporators 115 (LT case 115a and MT case 115b). As described above, LT case 115a may be configured to receive liquid refrigerant of a first temperature and MT case 115b may be configured to receive liquid refrigerant of a second temperature, wherein the first temperature (e.g., −29° C.) is lower in temperature than the second temperature (e.g., −7° C.). As an example, an LT case 115a may be a freezer in a grocery store and an MT case 115b may be a cooler in a grocery store.

In some embodiments, the liquid refrigerant leaves flash tank 105 through a first line to the LT case and a second line to the MT case. When the refrigerant leaves flash tank 105, the temperature and pressure in the first line may be the same as the temperature and pressure in the second line (e.g., 4° C. and 38 bar). Before reaching cases 115, the liquid refrigerant may be directed through one or more expansion valves 110 (e.g., 110a and 110b of FIG. 1). In some embodiments, each valve may be controlled (e.g., by controller 100 described below) to adjust the temperature and pressure of the liquid refrigerant.

For example, valve 110a may be configured to discharge the liquid refrigerant at −29° C. and 14 bar to LT case 115a and valve 110b may be configured to discharge the liquid refrigerant at −7° C. and 30 bar to MT case 115b. In some embodiments, each evaporator 115 is associated with a particular valve 110 and the valve 110 controls the temperature and pressure of the liquid refrigerant that reaches that evaporator 115.

Refrigeration system 101 may include at least one controller 100 in some embodiments. Controller 100 may be configured to direct the operations of the refrigeration system. Controller 100 may be communicably coupled to one or more components of the refrigeration system (e.g., flash tank 105, expansion valve 205, expansion valves 110, evaporators 115, compressors 120, gas cooler 130, and/or high pressure expansion valve 135).

Controller 100 may be configured to control the operations of one or more components of refrigeration system 101. For example, controller 100 may be configured to turn parallel compressor 120c on and off. As another example, controller 100 may be configured to open and close valve(s) 205, 110 and/or 135. As another example, controller 100 may be configured to adjust a set point for the pressure of flash tank 105.

In some embodiments, controller 100 may further be configured to receive information about the refrigeration system from one or more sensors. As an example, controller 100 may receive information about the ambient temperature of the environment (e.g., outdoor temperature) from one or more sensors. As another example, controller 100 may receive information about the system load from sensors associated with compressors 120. As yet another example, controller 100 may receive information about the temperature and/or pressure of the refrigerant from sensors positioned at any suitable point(s) in the refrigeration system (e.g., temperature at the outlet of gas cooler 130, suction pressure of MT compressor 120b, pressure of flash tank 105, temperature or pressure at heat exchanger 210, etc.).

As described above, controller 100 may be configured to provide instructions to one or more components of the refrigeration system. Controller 100 may be configured to provide instructions via any appropriate communications link (e.g., wired or wireless) or analog control signal. As depicted in FIG. 1, controller 100 is configured to communicate with components of the refrigeration system. For example, in response to receiving an instruction from controller 100, the refrigeration system may adjust a valve to bypass subcooler 200 or adjust an amount of refrigerant flowing through expansion valve 205. In some embodiments, controller 100 includes or is a computer system.

This disclosure recognizes that a refrigeration system, such as that depicted in FIG. 1, may comprise one or more other components. As an example, the refrigeration system may comprise one or more suction accumulators in some embodiments. Some systems may include a booster system with ejectors and parallel compression. One of ordinary skill in the art will appreciate that the refrigeration system may include other components not mentioned herein.

When one component of refrigeration system 101 is referred to as coupled to another component of refrigeration system 101, the two components may be directly or indirectly coupled. For example, a refrigerant outlet of heat exchanger 210 may be coupled to an inlet of gas cooler 130 via a refrigerant line (illustrated as connecting lines with arrows indicating the direction of refrigerant flow). High pressure vapor compressor 215 may be coupled to the refrigerant outlet of heat exchanger 210 and the inlet of gas cooler 130. The refrigerant outlet of heat exchanger 210 may be referred to as coupled to high pressure vapor compressor 215 (i.e., directly) or coupled to the inlet of gas cooler 130 (i.e., indirectly via the refrigerant line and high pressure vapor compressor 215).

Figure 2A:
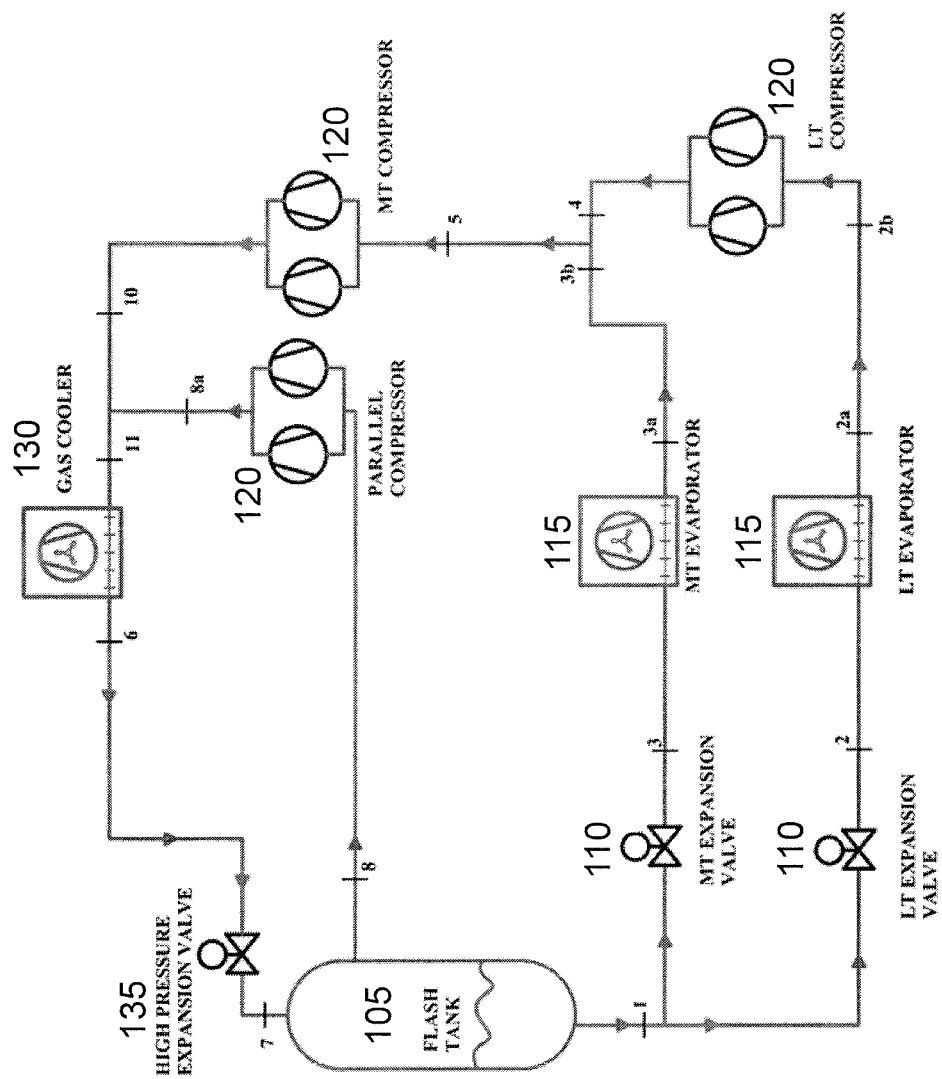
FIGS. 2A and 2B illustrate example temperatures and pressures at various locations of a transcritical refrigeration system without a subcooler.
Figure 2B:
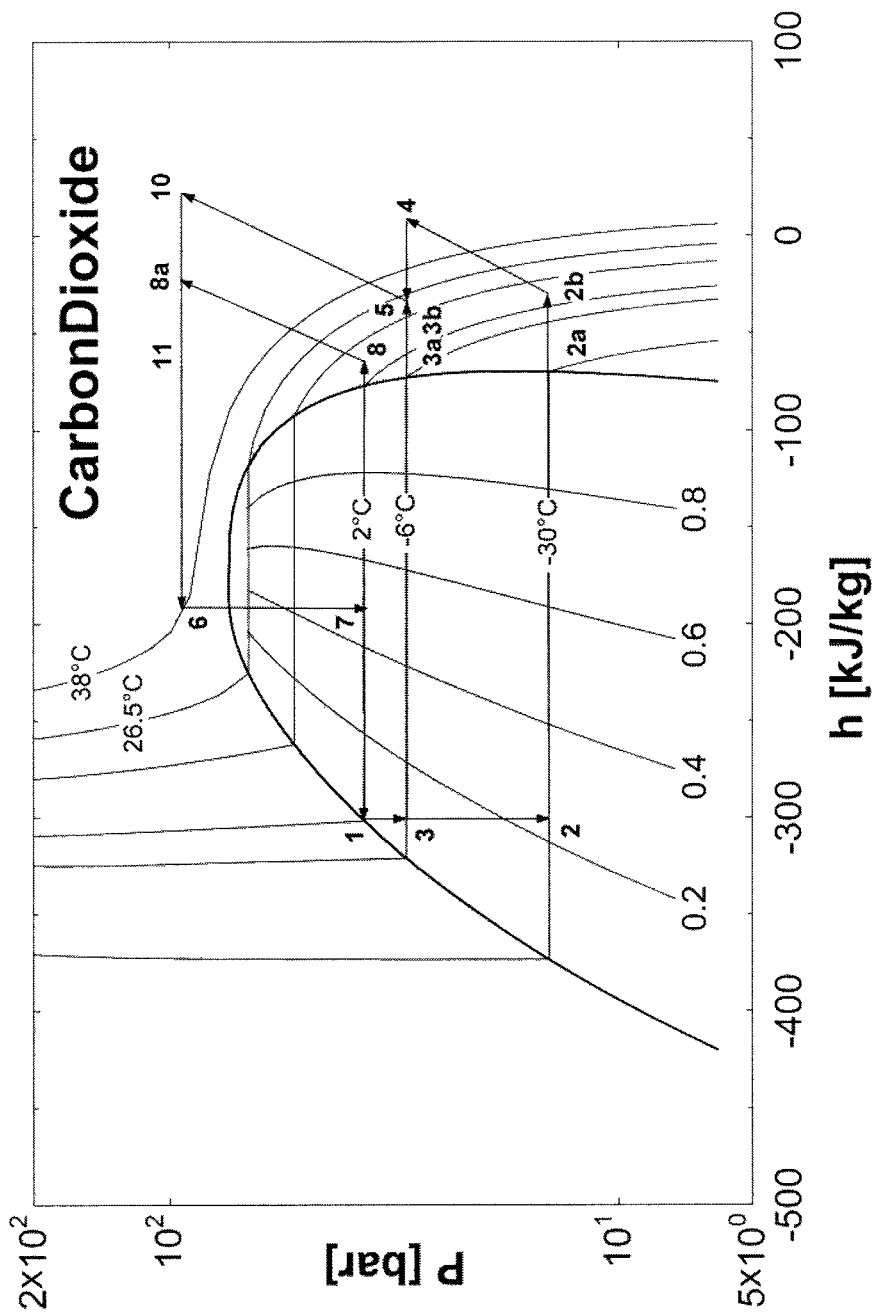
Figure 3A:
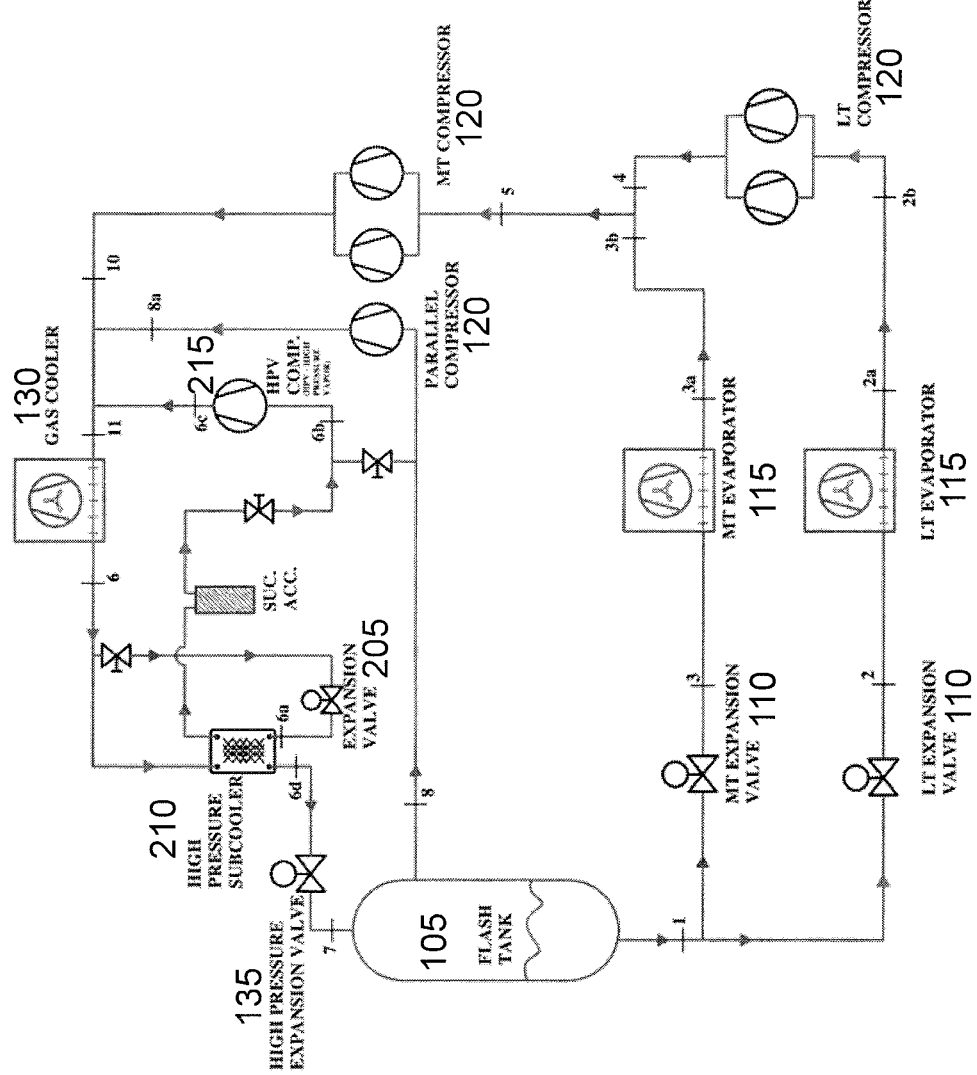
FIGS. 3A and 3B illustrate example temperatures and pressures at various locations of a transcritical refrigeration system with a subcooler.
Figure 3B:
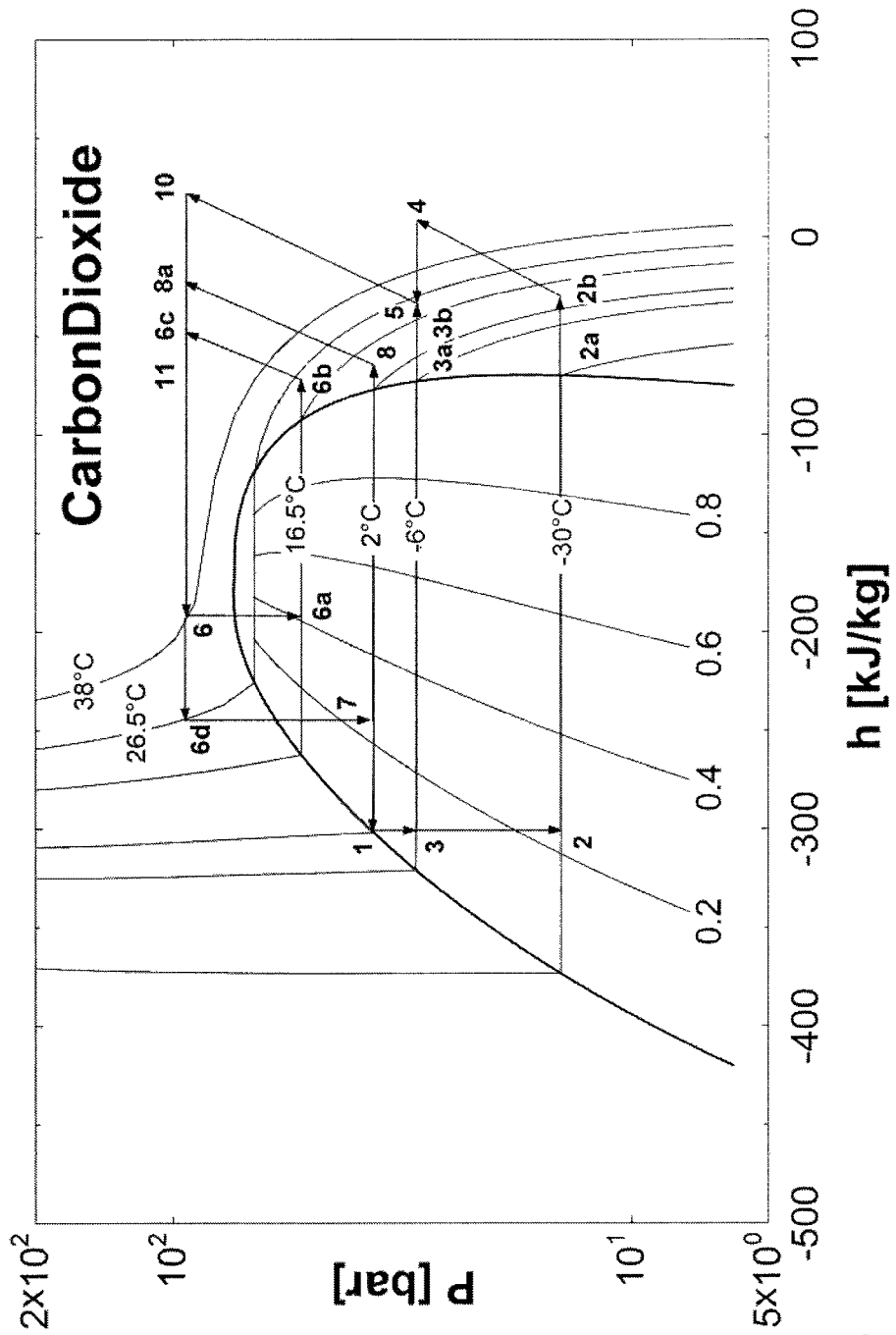

FIGS. 2A and 2B illustrate example temperatures and pressures at various locations of a transcritical refrigeration system without a subcooler, and FIGS. 3A and 3B illustrate example temperatures and pressures at various locations of a transcritical refrigeration system with a subcooler.

FIG. 2A is a block diagram of an example transcritical refrigeration system without a subcooler. The components of FIG. 2A are similar to the correspondingly numbered components of refrigeration system 101 described with respect to FIG. 1.

The illustrated example includes various numbered locations throughout the refrigeration system (e.g., location 1, 2, 2a, 2b, 3, 3a, 3b, etc.). The numbered locations correspond to coordinates of the graph illustrated in FIG. 2B.

FIG. 2B is a graph illustrated pressure and temperature associated with particular locations labelled in FIG. 2A. The vertical axis represents pressure and the horizontal axis represents enthalpy. The illustrated example is for a system using $CO_2$ refrigerant.

FIG. 3A is a block diagram of an example transcritical refrigeration system with a subcooler. The components of FIG. 3A are similar to the correspondingly numbered components of refrigeration system 101 described with respect to FIG. 1.

The illustrated example includes various numbered locations throughout the refrigeration system (e.g., location 1, 2, 2a, 2b, 3, 3a, 3b, etc.). The numbered locations correspond to coordinates of the graph illustrated in FIG. 3B.

FIG. 3B is a graph illustrated pressure and temperature associated with particular locations labelled in FIG. 3A. The vertical axis represents pressure and the horizontal axis represents enthalpy. The illustrated example is for a system using $CO_2$ refrigerant.

The following tables illustrate an example of the efficiencies gained by subcooler 200 at various operating temperatures. Tables 1 and 2 summarize the design and environmental conditions used for analysis and Table 3 summarizes the results.

TABLE 1

Design Consideration of LT and MT Refrigeration Cases

|  | LT | MT |
|---|---|---|
| Evaporator Temperature, ° C. | −30 | −6 |
| Net Refrigeration Capacity, kW | 20 | 121 |
| Evaporator Superheat, ° C. | 5 | 5 |
| Suction Line Superheat, ° C. | 10 | 5 |

TABLE 2

Environmental Design Consideration

| | |
|---|---|
| Ambient Temperature for analysis, ° C. | 27, 29, 32, 35, 38 |
| Gas Cooler Outlet Temperature for analysis, ° C. | 30, 32, 35, 38, 41 |
| Optimum Gas Cooler Pressure for analysis, bar | 74.2, 79.1, 86.4, 93.7, 101 |
| Flash Tank Temperature, ° C. | 2 |
| Subcooler HX Efficiency, % | 90 |
| Subcooler HX Superheat, ° C. | 5 |
| Subcooler Evaporator Pressure, bar | $\sqrt{GC_{pr} * MT_{pr}}$ |

TABLE 3

Result Summary

| Gas Cooler Outlet Temp, ° C. | Total Evaporator Capacity, kW | Power Input, kW | | COP | | Increase in Efficiency (%) |
|---|---|---|---|---|---|---|
| | | Parallel Compression Only | Parallel Compression & enhanced subcooler | Parallel Compression Only | Parallel Compression & enhanced subcooler | |
| 30 | 141 | 58 | 56 | 2.42 | 2.54 | 4.8 |
| 32 | 141 | 65 | 61 | 2.18 | 2.31 | 5.7 |
| 35 | 141 | 75 | 70 | 1.89 | 2.02 | 7 |
| 38 | 141 | 86 | 79 | 1.64 | 1.78 | 8.2 |
| 41 | 141 | 97 | 89 | 1.45 | 1.59 | 9.5 |

As illustrated by Tables 1-3, at higher ambient temperature conditions, the transcritical $CO_2$ refrigeration booster system with subcooler and parallel compression is 9.5% higher in efficiency compared to the parallel compression system. Thus, particular embodiments described herein may be particularly suitable for geographic regions where higher temperatures prevail for longer durations of the year.

While particular examples may refer to calculations for a single capacity transcritical $CO_2$ refrigeration booster system, the embodiments described herein may apply to any suitable capacity transcritical $CO_2$ refrigeration booster system. Particular embodiments may or may not include parallel compression.

FIG. 4 illustrates an example controller 100 for a refrigeration system, such as controller 100 of FIG. 1, according to certain embodiments of the present disclosure. Controller 100 may comprise one or more interfaces 610, memory 620, and one or more processors 630. Interface 610 receives input (e.g., sensor data or system data), sends output (e.g., instructions), processes the input and/or output, and/or performs other suitable operation. Interface 610 may comprise hardware and/or software. As an example, interface 610 receives information from sensors, such as information about the ambient temperature of refrigeration system, information about the load of the refrigeration system, information about the temperature of the refrigerant at any suitable point(s) in the refrigeration system, and/or information about the pressure of the refrigerant at any suitable point(s) in the refrigeration system (e.g., temperature at the outlet of gas cooler 130, suction pressure of MT compressor 120b, pressure of flash tank 105, etc.). Controller 100 may compare the received information to thresholds to determine whether to adjust operation of the refrigeration system. As an example, controller 100 may adjust an amount or a temperature of a refrigerant flowing to heat exchanger 210 and/or expansion valve 205. In particular embodiments, controller 100 may make adjustments based on input from various sensors, such as ambient temperature.

In some embodiments, if controller 100 determines to adjust operation of the refrigeration system, controller 100 sends instructions to the component(s) of the refrigeration system that controller 100 has determined to adjust.

Processor 630 may include any suitable combination of hardware and software implemented in one or more modules to execute instructions and manipulate data to perform some or all of the described functions of controller 100. In some embodiments, processor 630 may include, for example, one or more computers, one or more central processing units (CPUs), one or more microprocessors, one or more applications, one or more application specific integrated circuits (ASICs), one or more field programmable gate arrays (FPGAs), and/or other logic.

Memory (or memory unit) 620 stores information. As an example, memory 620 may store one or more temperature thresholds and one or more corresponding set points for components of system 101. Controller 100 may use these stored thresholds to determine whether to adjust the components of system 101. Memory 620 may comprise one or more non-transitory, tangible, computer-readable, and/or computer-executable storage media. Examples of memory 620 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, the refrigeration system may include any suitable number of compressors, condensers, condenser fans, evaporators, valves, sensors, controllers, and so on, as performance demands dictate. One skilled in the art will also understand that the refrigeration system can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A transcritical refrigeration system configured to circulate refrigerant through the transcritical refrigeration system to provide refrigeration, the transcritical refrigeration system comprising:
    a gas cooler, a heat exchanger, an expansion valve, a high pressure expansion valve, a flash tank, a medium-temperature refrigeration case, a low-temperature refrigeration case, a high pressure vapor compressor, a parallel compressor, a medium-temperature compressor, and a low-temperature compressor;
    the gas cooler comprising a gas cooler inlet and a gas cooler outlet and configured to cool the refrigerant to a first temperature and provide a flow of the refrigerant;
    the heat exchanger comprising:
        a first refrigerant inlet coupled to the gas cooler outlet and configured to receive a first portion of the flow of the refrigerant from the gas cooler;
        a second refrigerant inlet coupled to the gas cooler, via the expansion valve, and configured to receive a second portion of the flow of the refrigerant from the gas cooler;
        a first refrigerant outlet coupled to the high pressure expansion valve; and
        a second refrigerant outlet coupled to the high pressure vapor compressor;
    the heat exchanger configured to cool the first portion of the refrigerant flowing from the first refrigerant inlet to the first refrigerant outlet to a second temperature less than the first temperature using the second portion of the refrigerant flowing from the second refrigerant inlet to the second refrigerant outlet;
    the expansion valve coupled between the gas cooler outlet and the second refrigerant inlet of the heat exchanger, the expansion valve configured to cool the refrigerant flowing from the gas cooler outlet to the second refrigerant inlet of the heat exchanger;
    the high pressure expansion valve coupled to the flash tank and configured to reduce a pressure of the refrigerant flowing from the first refrigerant outlet of the heat exchanger to the flash tank;
    the flash tank coupled to the medium-temperature and low-temperature refrigeration cases and to the parallel compressor such that a liquid portion of the refrigerant flows from the flash tank to the medium-temperature case and the low-temperature refrigeration case and a vapor portion of the refrigerant flows from the flash tank to the parallel compressor, wherein a pressure of the vapor portion of the refrigerant is less than a pressure of the refrigerant flowing from the expansion valve to the second refrigerant inlet of the heat exchanger;
    the medium-temperature refrigeration case coupled to the medium-temperature compressor;
    the low-temperature refrigeration case coupled to the low-temperature compressor;
    the low-temperature compressor coupled between the low-temperature refrigeration case and the medium-temperature compressor, the low-temperature compressor configured to compress the refrigerant flowing from the low-temperature refrigeration case;
    the high pressure vapor compressor coupled between the second refrigerant outlet of the heat exchanger and the gas cooler inlet, the high pressure vapor compressor configured to compress a vapor form of the refrigerant flowing from the second refrigerant outlet of the heat exchanger;
    the medium-temperature compressor coupled to the medium-temperature refrigeration case, the low-temperature compressor, and the gas cooler inlet, the medium-temperature compressor configured to receive the refrigerant flowing from both the medium-temperature refrigeration case and the low-temperature compressor, compress the received refrigerant, and provide the compressed refrigerant to the gas cooler inlet; and
    the parallel compressor coupled between the flash tank and the gas cooler inlet and configured to compress the vapor portion of the refrigerant flowing from the flash tank;
    wherein the high pressure vapor compressor, the parallel compressor, and the medium-temperature compressor are coupled in parallel to the gas cooler inlet.

2. The transcritical refrigeration system of claim 1, further comprising a valve coupled between the gas cooler outlet and the heat exchanger, the valve operable to direct a flow of the refrigerant towards the heat exchanger or towards the high pressure expansion valve.

3. The transcritical refrigeration system of claim 2, further comprising a processor operable to control the valve to direct the flow of the refrigerant towards the heat exchanger or towards the high pressure expansion valve.

4. The transcritical refrigeration system of claim 3, wherein the processor controls the valve to direct the flow of the refrigerant towards the heat exchanger when an ambient temperature is above a threshold.

5. The transcritical refrigeration system of claim 4, wherein the threshold is greater than or equal to thirty degrees Celsius.

6. The transcritical refrigeration system of claim 1, further comprising:
    a processor operable to control the expansion valve to modify a temperature of the refrigerant flowing towards the second refrigerant inlet of the heat exchanger.

7. The transcritical refrigeration system of claim 6, wherein the processor modifies the temperature of the refrigerant flowing towards the second refrigerant inlet of the heat exchanger based on an ambient temperature.

8. The transcritical refrigeration system of claim 1, wherein the refrigerant comprises a carbon dioxide ($CO_2$) refrigerant.

9. The transcritical refrigeration system of claim 1, further comprising a controller coupled to the expansion valve, the controller comprising a processor configured to cause the expansion valve to adjust a temperature of the refrigerant flowing from the expansion valve to the second inlet of the heat exchanger, based on an ambient temperature.

10. A transcritical refrigeration system configured to circulate refrigerant through the transcritical refrigeration system to provide refrigeration, the transcritical refrigeration system comprising:
   a gas cooler configured to cool the refrigerant circulated through the transcritical refrigeration system to a first temperature and provide a flow of the refrigerant;
   a heat exchanger comprising:
      a first refrigerant inlet coupled to the gas cooler and configured to receive a first portion of the flow of the refrigerant from the gas cooler;
      a second refrigerant inlet coupled to the gas cooler, via an expansion valve, and configured to receive a second portion of the flow of the refrigerant from the gas cooler;
      a first refrigerant outlet coupled to a high pressure expansion valve; and
      a second refrigerant outlet coupled to a high pressure vapor compressor;
   the heat exchanger configured to:
      further cool the first portion of the refrigerant flowing from the first refrigerant inlet to the first refrigerant outlet to a second temperature less than the first temperature using the second portion of the refrigerant flowing from the second refrigerant inlet to the second refrigerant outlet;
      allow transmission of the further cooled refrigerant from the first refrigerant outlet to a high pressure expansion valve coupled to a flash tank of the transcritical refrigeration system; and
      allow transmission of the refrigerant from the second refrigerant outlet to the high pressure vapor compressor;
   the flash tank coupled to a medium-temperature refrigeration case, a low-temperature refrigeration case, and a parallel compressor, the flash tank configured to provide a liquid portion of the refrigerant from the flash tank to the medium-temperature and low-temperature refrigeration cases and a vapor portion of the refrigerant from the flash tank to the parallel compressor;
   a low-temperature compressor coupled to the low-temperature refrigeration case and configured to compress the refrigerant flowing from the low-temperature refrigeration case;
   a medium-temperature compressor coupled to the medium-temperature refrigeration case, the low-temperature compressor, and the gas cooler, the medium-temperature compressor configured to receive the refrigerant flowing from both the medium-temperature refrigeration case and the low-temperature compressor, compress the received refrigerant, and provide the compressed refrigerant to the gas cooler;
   the high pressure vapor compressor coupled between the second refrigerant outlet of the heat exchanger and the gas cooler, the high pressure vapor compressor configured to compress a vapor form of the refrigerant flowing from the second refrigerant outlet of the heat exchanger; and
   the parallel compressor coupled between the flash tank and the gas cooler and configured to compress the vapor portion of the refrigerant flowing from the flash tank;
   wherein the high pressure vapor compressor, the parallel compressor, and the medium-temperature compressor are coupled in parallel to the gas cooler.

11. The transcritical refrigeration system of claim 10, further comprising the expansion valve coupled to the second inlet of the heat exchanger, the expansion valve operable to control the flow of refrigerant towards the second inlet of the heat exchanger.

12. The transcritical refrigeration system of claim 11, wherein a processor is communicatively coupled to the expansion valve to control the flow of refrigerant towards the second inlet of the heat exchanger.

13. The transcritical refrigeration system of claim 12, wherein the processor controls the expansion valve to direct the flow of refrigerant towards the second inlet of the heat exchanger when an ambient temperature is above a threshold.

14. The transcritical refrigeration system of claim 13, wherein the threshold is greater than or equal to thirty degrees Celsius.

15. The transcritical refrigeration system of claim 10, further comprising:
   the expansion valve coupled to the second inlet of the heat exchanger, the expansion valve operable to cool the refrigerant flowing from the gas cooler to the second inlet to the second temperature; and
   wherein a processor is communicatively coupled to the expansion valve to modify a temperature of the refrigerant flowing towards the heat exchanger.

16. The transcritical refrigeration system of claim 15, wherein the processor modifies the temperature of the refrigerant flowing towards the heat exchanger based on an ambient temperature.

17. The transcritical refrigeration system of claim 10, wherein the refrigerant comprises a carbon dioxide ($CO_2$) refrigerant.

* * * * *